(12) United States Patent
Genung

(10) Patent No.: US 8,910,841 B2
(45) Date of Patent: Dec. 16, 2014

(54) METHOD AND PORTABLE APPARATUS FOR TRANSPORTING, DISPLAYING AND SERVING FOOD

(76) Inventor: Thomas A. Genung, Indianapolis, IN (US)

( * ) Notice: Subject to any disclaimer, the term of this patent is extended or adjusted under 35 U.S.C. 154(b) by 302 days.

(21) Appl. No.: 13/338,429

(22) Filed: Dec. 28, 2011

(65) Prior Publication Data

US 2012/0168476 A1    Jul. 5, 2012

Related U.S. Application Data

(60) Provisional application No. 61/460,313, filed on Jan. 3, 2011.

(51) Int. Cl.
| | |
|---|---|
| *B60N 3/10* | (2006.01) |
| *B60R 7/00* | (2006.01) |
| *B60R 7/04* | (2006.01) |
| *B60R 7/08* | (2006.01) |
| *B60R 5/00* | (2006.01) |

(52) U.S. Cl.
CPC .............. *B60R 7/043* (2013.01); *B60N 3/103* (2013.01); *B60R 7/08* (2013.01); *B60R 7/00* (2013.01); *B60R 7/04* (2013.01); *B60R 5/00* (2013.01)
USPC .......................................... 224/274; 224/275

(58) Field of Classification Search
CPC .............. B60R 7/00; B60R 7/04; B60R 7/08; B60R 5/00
USPC ................................... 224/274, 275; 220/694
See application file for complete search history.

(56) References Cited

U.S. PATENT DOCUMENTS

| | | | | |
|---|---|---|---|---|
| 3,800,939 | A * | 4/1974 | Cornelius | 224/275 |
| 3,873,010 | A * | 3/1975 | Patterson | 224/275 |
| 3,909,092 | A * | 9/1975 | Kiernan | 312/235.8 |
| 4,254,872 | A * | 3/1981 | Garrett | 206/561 |
| 4,512,503 | A * | 4/1985 | Gioso | 224/539 |
| 4,659,099 | A * | 4/1987 | Malone | 280/304.1 |
| 4,832,241 | A * | 5/1989 | Radcliffe | 224/275 |
| 4,872,723 | A * | 10/1989 | Kopf | 297/216.1 |
| 4,928,865 | A * | 5/1990 | Lorence et al. | 224/275 |
| 4,942,990 | A * | 7/1990 | White | 224/42.33 |
| 5,037,162 | A * | 8/1991 | Ransom | 312/236 |
| 5,094,375 | A * | 3/1992 | Wright | 224/404 |
| 5,294,026 | A * | 3/1994 | McGirt | 224/549 |
| 5,299,722 | A * | 4/1994 | Cheney | 224/404 |
| 5,429,290 | A * | 7/1995 | Greene, Jr. | 224/274 |
| 5,630,537 | A * | 5/1997 | Sciacca | 224/629 |
| 5,649,654 | A * | 7/1997 | Hayward, Jr. | 224/270 |
| 5,685,591 | A * | 11/1997 | Simplicean et al. | 296/37.16 |
| 5,687,895 | A * | 11/1997 | Allison et al. | 224/542 |
| 5,772,058 | A * | 6/1998 | Staesche | 220/6 |
| 5,829,655 | A * | 11/1998 | Salopek | 224/402 |

(Continued)

*Primary Examiner* — Brian D Nash
(74) *Attorney, Agent, or Firm* — David H. Badger

(57) ABSTRACT

A method and apparatus providing self-service of food items, such as snacks, including a portable food displaying and serving apparatus capable of transforming a vehicle, such as a golf cart, into a traveling food purveying apparatus permitting the selection of food items for consumption from an array of displayed food items by possible consumers.

19 Claims, 7 Drawing Sheets

(56) References Cited

U.S. PATENT DOCUMENTS

| | | | |
|---|---|---|---|
| 5,979,725 A * | 11/1999 | Lehrman | 224/539 |
| 6,032,840 A * | 3/2000 | Gregory | 224/275 |
| 6,276,582 B1 * | 8/2001 | Alexander | 224/275 |
| 6,279,798 B1 * | 8/2001 | Partch et al. | 224/275 |
| 6,422,440 B1 * | 7/2002 | Stone | 224/275 |
| 6,874,667 B2 * | 4/2005 | Dykstra et al. | 224/498 |
| 7,350,681 B2 * | 4/2008 | Polburn et al. | 224/275 |
| 2006/0054649 A1 * | 3/2006 | Tippmann | 224/625 |
| 2006/0091169 A1 * | 5/2006 | Lippert et al. | 224/275 |
| 2008/0142558 A1 * | 6/2008 | Dexter | 224/275 |
| 2008/0245793 A1 * | 10/2008 | Hanson et al. | 220/263 |

* cited by examiner

METHOD AND PORTABLE APPARATUS FOR TRANSPORTING, DISPLAYING AND SERVING FOOD

This patent application claims the benefit of the filing date of U.S. provisional patent application Ser. No. 61/460,313 filed Jan. 3, 2010.

FIELD OF THE INVENTION

This invention is related to methods and apparatus including food service and provides new and improved methods and apparatus for transporting, displaying, serving and, when desired, selling food items.

BACKGROUND OF THE INVENTION

There are many methods and apparatus for displaying and serving food items. For example, cafeterias display for sale a variety of food items, such as meats and fish, potatoes, rice, hot vegetables, etc., on steam tables, and salads and desserts from unheated and refrigerated display tables. Consumers walk past the steam table and unheated displays, choosing from the displayed food items and indicating those food items they wish to eat which are handed to them by cafeteria servers. Foods are also served inside at restaurants where food items are chosen and ordered from menus and pictures and brought to a table for consumption, and outside at booths and vehicles where food items are chosen from menus and/or pictures and served over a counter for consumption, and at fast food establishments where food items are ordered from menus and/or pictures and served over a counter. Food items are also sold curbside from carts, trucks and stands where food items are selected from menus, pictures and, like a cafeteria, from open displays of food items and are served over a counter.

There many occasions where consumers want to congregate and eat outdoors, such as sponsored outdoor events, sporting events, picnics, tailgating parties, golfing tournaments, club outings and the like. During club outings and tailgating parties, for examples, food items, such as meat, are frequently cooked on charcoal and gas grills, and other prepared food items are frequently prepared and brought to the outing or party. In these instances the food items are generally brought in containers which have been filled with the food items as they were prepared and brought separately to the outing or party in the bowls and served from the bowls in which they were brought.

BRIEF SUMMARY OF THE INVENTION

The invention provides new and improved methods and apparatus for purveying food items for consumption, which are particularly advantageous and convenient for purveying food items over an extensive area outdoors. For example, the invention provides:

a new and improved method and apparatus for self-serve selection and consumption of food items;

a new and improved method and apparatus for displaying and serving foods items for consumption;

a new and improved method and apparatus for transporting, displaying, serving and selling snacks, finger foods and bite-size snacks;

a new and improved method and apparatus for adapting a vehicle for the transportation, display and purveyance of food items;

a new and improved apparatus for purveying food items, such as finger foods and bite-size snacks, for consumption, particularly outdoors;

a new and improved, and preferably portable, food item carrier for displaying pluralities of, preferably, snack items and permitting self-serve selection and consumption of snack items from the carrier; and a new and improved portable apparatus adapted for connection with a vehicle for transporting and displaying pluralities of food items, particularly finger foods and bite-size snack items, and for permitting self-serve selection of the displayed food items from the pluralities of displayed finger foods and bite-size items.

Where herein I refer to "finger foods", I mean food items adapted for consumption using only the consumer's fingers, without using a supporting plate or eating utensiles, such as barbequed ribs, chicken wings, skewers carrying pieces of meat, fish, shrimp, fruit, vegetables, mushrooms and the like, and small sandwiches, cookies, small pieces of cake and pie, and the like. Where herein I refer to "bite-size" food items, I mean food items adapted to be consumed in a few bites, such as small pieces of cooked or cold meats, fruits and vegetables, small pieces of cheese, boiled or cooked shrimp, oysters, grapes, potato and corn chips, dipping sauces, nuts, cookies and crackers, small pieces of cake and pie, and the like. Where herein I refer to "snacks" and "snack-size", I mean food items traditionally considered as snacks, including finger-foods and bite-size food items. Those skilled in the art will realize that the listings of snacks, finger foods and bite size food items can include many additional such food items.

One example of the invention provides a method of transforming a typical golf cart, or other small vehicle, into a mobile means for displaying and serving a plurality of different food items to be selected for consumption by securing to a vehicle a portable, open top food item displaying and serving apparatus comprising an open-top container holding a plurality of food containers with open tops, permitting food items contained therein to be displayed and selected and removed for consumption by adjacent consumers. Thus, a plurality of food items may be transported over an extensive area, such as a golf course or parking lot, to locations adjacent golfers or tailgaters, and food items may be displayed for selection and consumption. And as a further example, the invention provides in a golf cart the improvement wherein a food displaying and serving apparatus may be located and secured on the passenger seat of a golf cart to transform the golf cart to a mobile food item displaying and serving apparatus.

The invention also provides and takes advantage of a new, and preferably portable, food item transporting, displaying and serving apparatus. The new food item transporting, displaying and serving apparatus may be made from any sufficiently rigid material, but preferably from a durable and rigid thermoplastic material, and includes a base comprising four walls without a bottom, or four walls extending upwardly from a floor to form, with the floor, an enclosable space. A panel, including a plurality of panel openings for carrying a plurality of preferably open-top food containers, is removably supported within the base (and above a base floor, if provided, which, with the four walls, can define an enclosed space) by panel-supporting means within the base. A plurality of open-top food containers are removably supported and carried by the panel in the plurality of panel openings, permitting the transportation, display and selection of food items from pluralities of food items carried within the plurality of food containers. The panel openings can be varied is size and shape to accommodate food containers of different sizes and shapes. Means for cooling and/or heating the food items in the plurality of food containers can be carried by the base.

The new apparatus can also, preferably, include a food cover carried by the base, which is preferably a flexible screen that can be carried by the base and movable between a first position where does not obstruct access to the food items carried in the plurality of food containers and a second position covering the food items carried by the food containers to protect them from airborne debris and insects, and to assist in maintaining a satisfactory temperature of the food items. One embodiment of such an apparatus can be adapted for use on a golf cart as set forth above for transporting a variety of desirable food items over a golf course during, for example, a tournament or a golf club outing, to permit golfers and/or spectators to select food items for consumption from the variety of food items on display. Such an embodiment can be adapted to rest on the passenger seat of a golf cart and can, if desired, have a means for engaging a portion of the golf cart to assist in retaining the apparatus in the golf cart as it travels over the golf course. Thus, the invention can transform a golf cart into a mobile food item display and serving vehicle.

Other features and advantages of the invention will be apparent from the accompanying drawings and more detailed description of the invention that follows.

MORE DETAILED DESCRIPTION OF THE INVENTION

Figure 1:
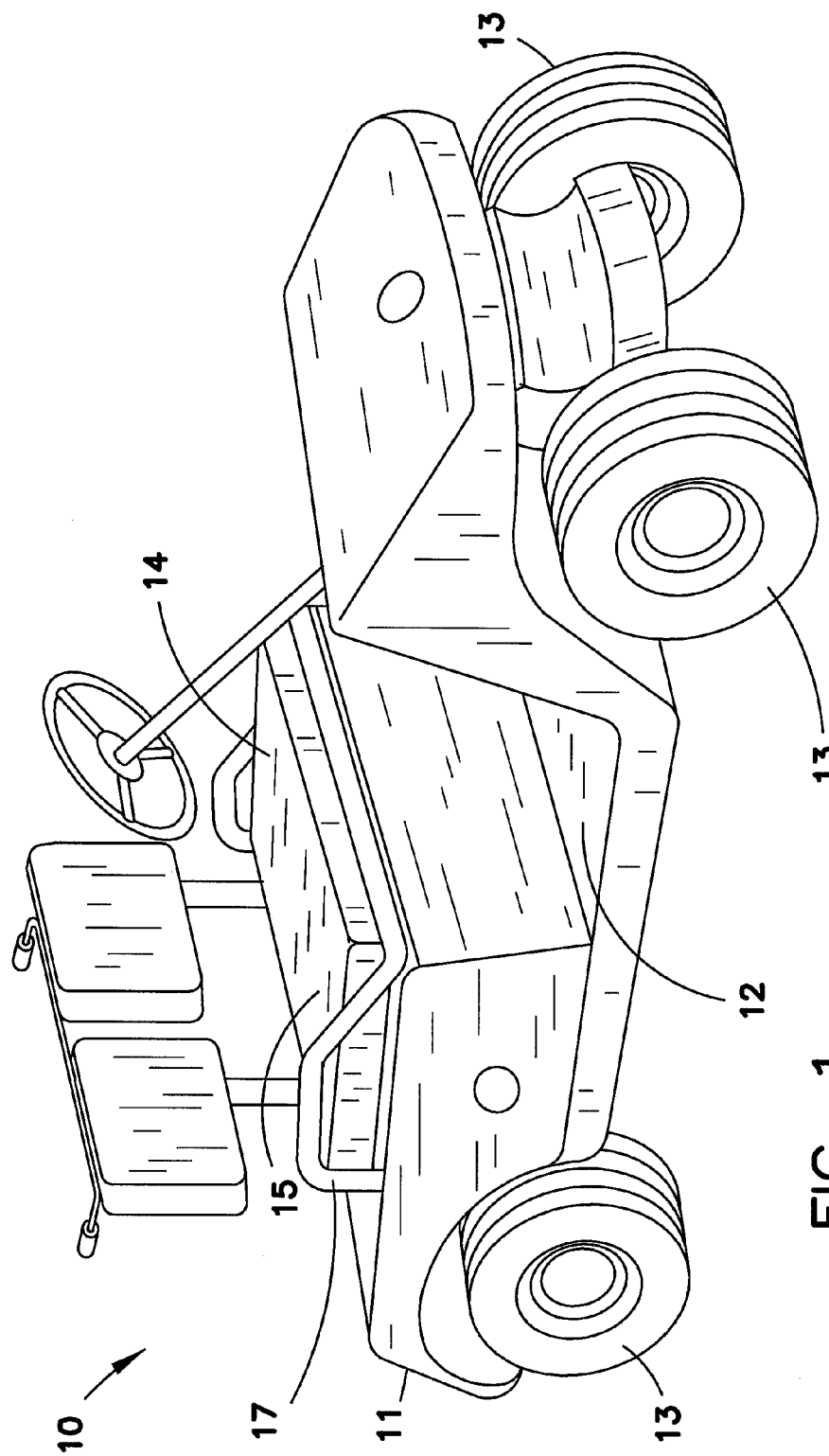
FIG. 1 shows a typical golf cart.

As set forth in this application and shown in the drawings, this invention provides new and improved methods and apparatus for the purveyance of food items, including many new features and advantages. The new and improved methods and apparatus can include, as one example, transformation of a small vehicle, such as a golf cart, into a mobile food item displaying and serving apparatus. FIG. 1 shows a typical golf cart 10 that includes, in addition to a body 11, a floor 12 and four wheels 13 driven by an electric or gasoline-driven motor (not shown), a driver's 14 seat and a passenger's seat 15, which are normally occupied by golfers. The golf cart shown in FIG. 1 also includes a tubular arm 17 adjacent the edge of the passenger seat, and can also include a roof supported above the driver and passenger seats, although, as shown, not all golf carts are so equipped.

Figure 2:
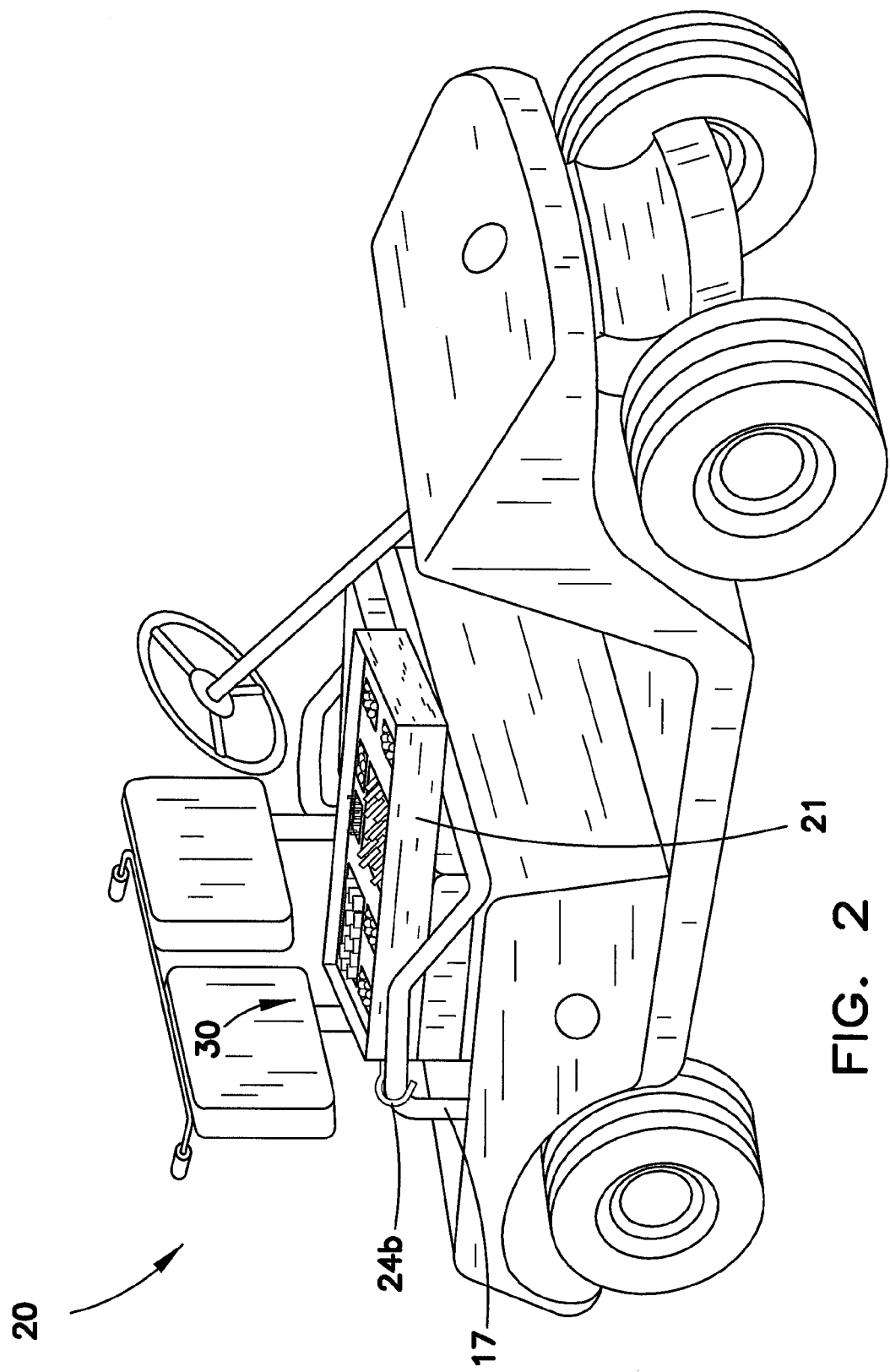
FIG. 2 illustrates the typical golf cart of FIG. 1 transformed by the invention into a mobile food item displaying and serving apparatus.

FIG. 2 shows the golf cart 10 of FIG. 1, which has been transformed into a mobile food item transporting, displaying and serving apparatus 20 by the invention. The method of transforming the golf cart 10 of FIG. 1 into the food item transporting, displaying and serving apparatus 20 includes presenting at the passenger side of the golf cart 10 an apparatus 21 of the invention providing a contained display 30 of pluralities of food items, such as finger foods and bite-size snack items. The mobile food item displaying and serving apparatus 20 transports the contained display of pluralities of finger food and bite-size snacks to possible consumers, where the mobile food item transporting, displaying and serving apparatus 20 is stopped, allowing consumers to select and serve themselves, from the contained display 30 of food items, one or more food items and remove the selected food items from the apparatus 21 providing the contained display 30 for consumption.

As described below, the plurality of food items in the contained display 30 can be cooled or heated as desired, and covered to protect the food items from airborne contamination, insects and debris. Thus, FIG. 2 shows an improvement in a vehicle 10 comprising securing to a vehicle 10 adjacent its passenger side 15 a food item displaying and serving apparatus 21 of the invention, providing a contained food display 30, permitting the transformed vehicle 20 to be driven to possible consumers of the food items carried in the food item displaying and serving apparatus 21, and the selection and removal, and purchase if appropriate, of any one or more of the displayed food items for consumption.

Figure 3:
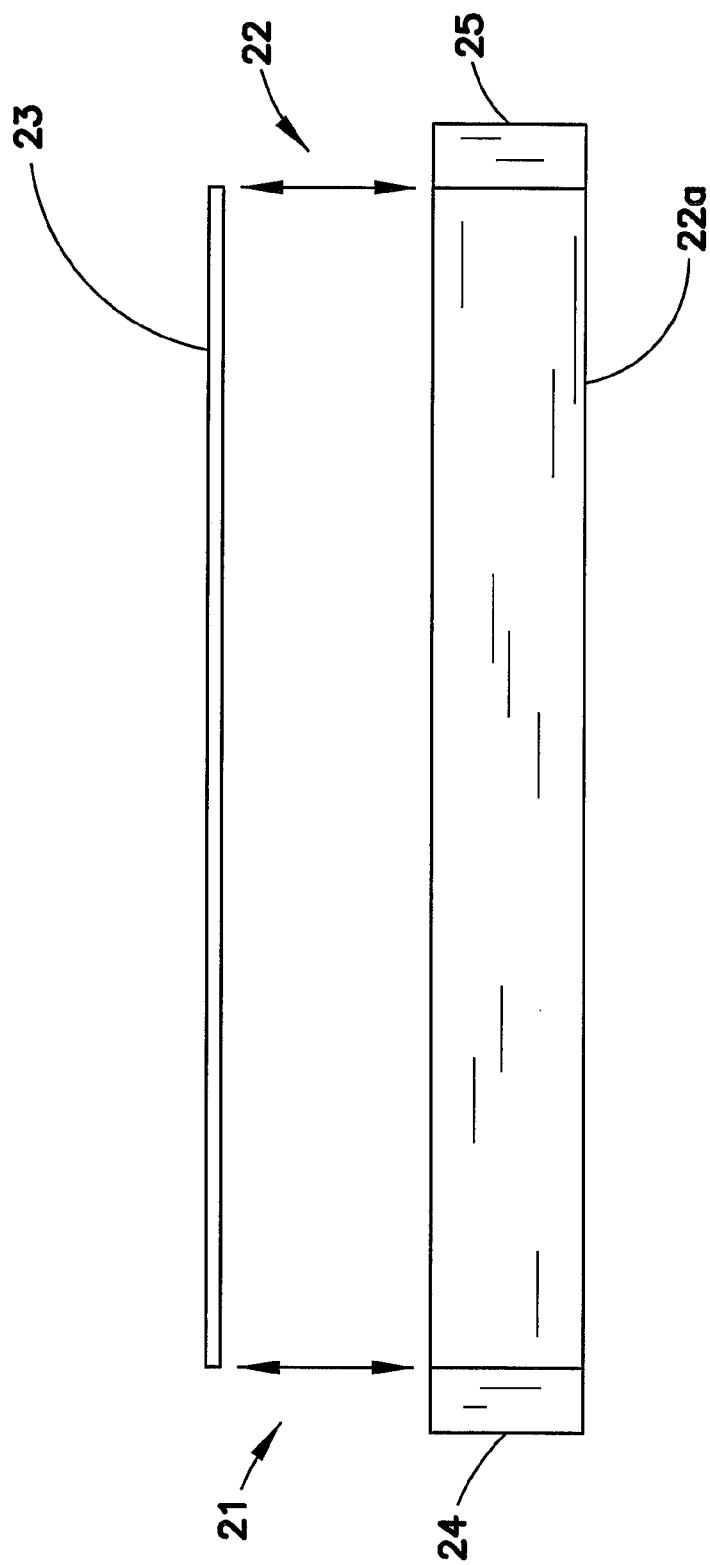
FIG. 3 is a diagrammatic presentation of a portable food transporting, displaying and serving apparatus of the invention of the type that can transform a golf cart, or other small vehicle, into a mobile food item displaying and serving apparatus.

FIG. 3 is a diagram to show the various parts that can make up a food item displaying and serving apparatus 21 of the invention. The food item displaying and serving apparatus 21 can include a base 22 and a panel 23 which can be removed from and inserted into the base (as indicated by the arrows in FIG. 3).

Figure 4:
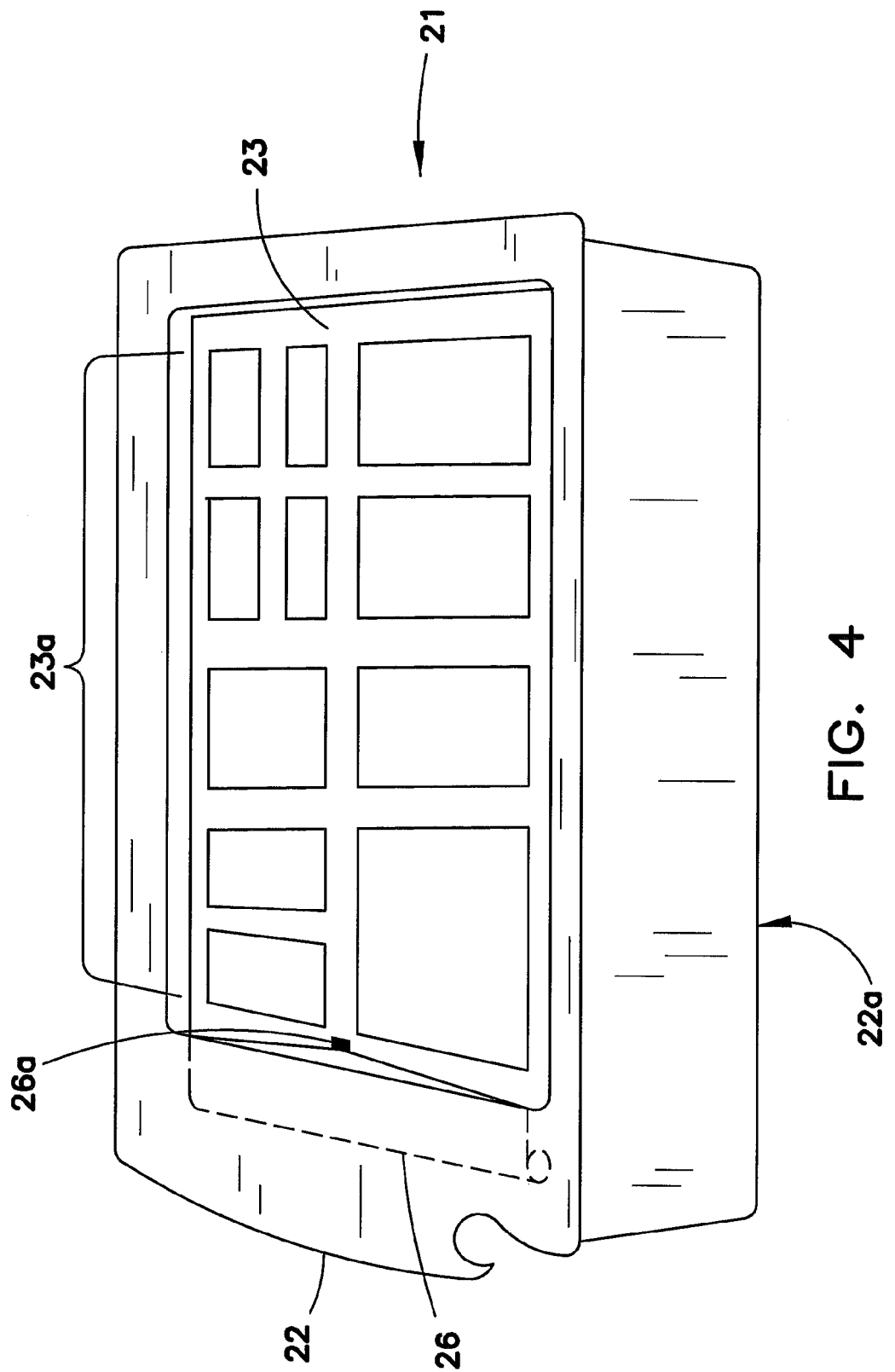
FIG. 4 is a perspective view from above of one possible embodiment of a portable food item display and serving apparatus of the invention.
Figure 5:
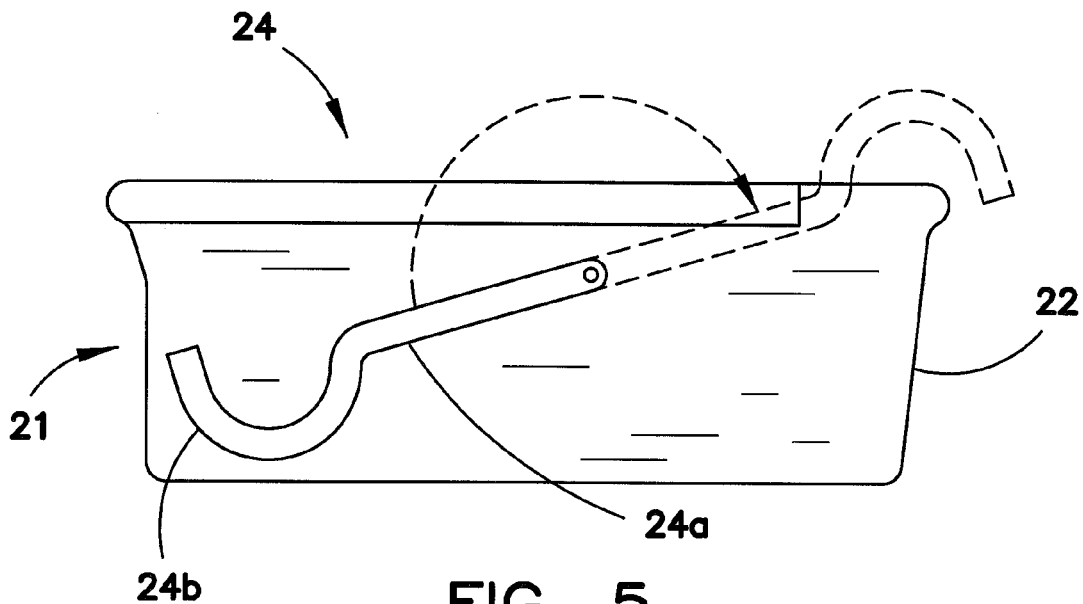
FIG. 5 is a view of one end of a food item display and serving apparatus like that shown in FIG. 4 to illustrate a possible means of securing the apparatus to a golf cart surface adjacent the passenger seat.
Figure 6:
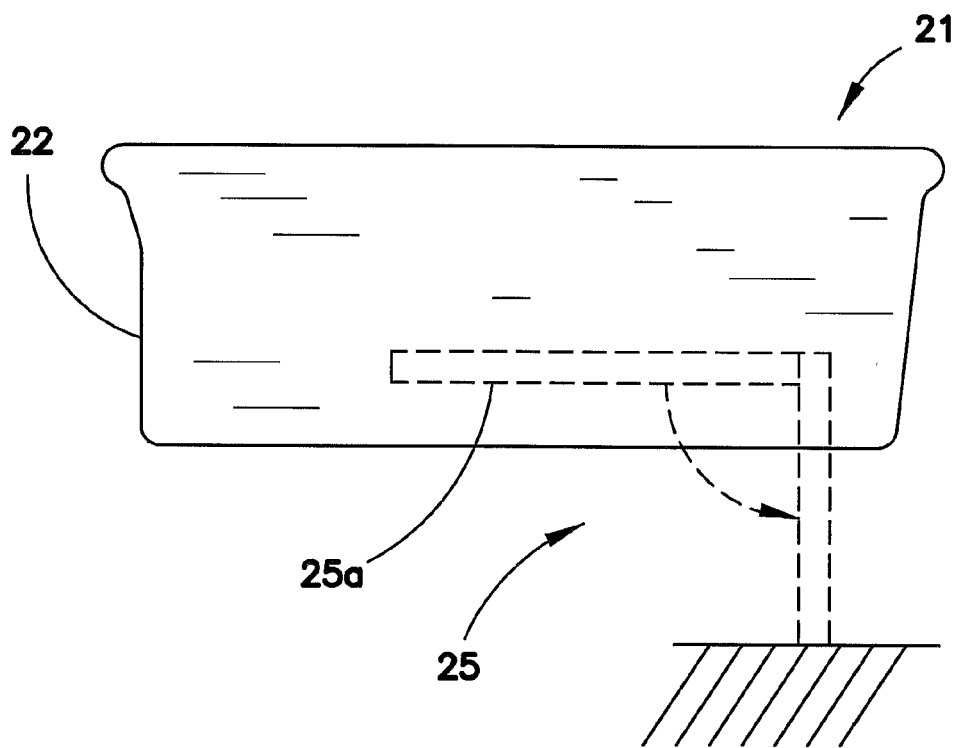
FIG. 6 is a view from one end of another food display and serving apparatus like that shown in FIG. 4 to illustrate one possible support for the food display and serving apparatus extending away from the other end of base to engage a surface or surfaces at the passenger side of a vehicle.

As shown in FIG. 4 and described in greater detail below, the panel 23 can be provided with a plurality of openings 23a of various sizes and shapes to carry food item containers to display the food items and permit their selection and removal from the food item displaying and serving apparatus 21. In some embodiments of a mobile food item transporting, displaying and serving apparatus 20, a means 24 and/or a means 25 may be used to maintain the base 22 securely within a vehicle. For example, as illustrated in FIGS. 5 and 6, at least one means 24 can secure the base 22 to a surface of a vehicle in position to permit access to food items displayed in apparatus 21. For example, in the golf cart illustrated in FIG. 2, first means 24 may engage a surface of the golf cart adjacent the passenger seat, and, if needed, a second means 25 may engage a surface of the golf cart forwardly of the passenger seat.

FIG. 4 illustrates one possible embodiment of a portable food item displaying and serving apparatus 21 of the invention, using the same element numbers as the corresponding elements of FIG. 3. In the embodiment illustrated in FIG. 4 the base can be, for example, formed, preferably, from a thermoplastic material, such as polypropylene, polyethylene, polystyrene, polyvinyl chloride or the like, by any convenient method. One preferable economical method of forming base 22 from polyethylene, which may be colored for promotional or decorative purposes, is by rotational molding. For example, when the apparatus is used at tailgating celebrations, the base 22 may be formed with one of the home team's colors. The removable panel 23 may also be formed from a relatively rigid plastic material with a plurality of spaced openings 23a. Where the apparatus will be used at a tailgating celebration, the removable panel may be a color selected so that the displaying and serving apparatus is in the two colors of the home team.

As illustrated in FIG. 4, removable panel 23 is, in the assembled food item displaying and serving apparatus 21, supported within the base 22 and spaced above the bottom of the base 22, or any the floor 22a that may be provided by the base 22, by means (not shown) within the base 22. Any of a number of means can provide support of panel 23 within the base 22. For example, the interior of the base 22 can be formed with an interior supporting ledge (not shown), or with a plurality of spaced edges (not shown) that project slightly into the interior of the base 22 and are located above the bottom of the base 22 on which the panel 23 rests. If the base 22 is provided with an attached bottom surface 22a, the panel 23 provides an enclosed space below the panel 23. When the apparatus 21 is being used to transport, display and serve food items, a plurality of open-top food containers 27, which are shaped to fit within the spaced openings 23a and to engage the edges of the panel 23 around the openings 23a and be supported above the bottom of the base 22, can carry a variety of different food items and are carried by the panel 23 above the bottom of the base 22.

Figure 4A:
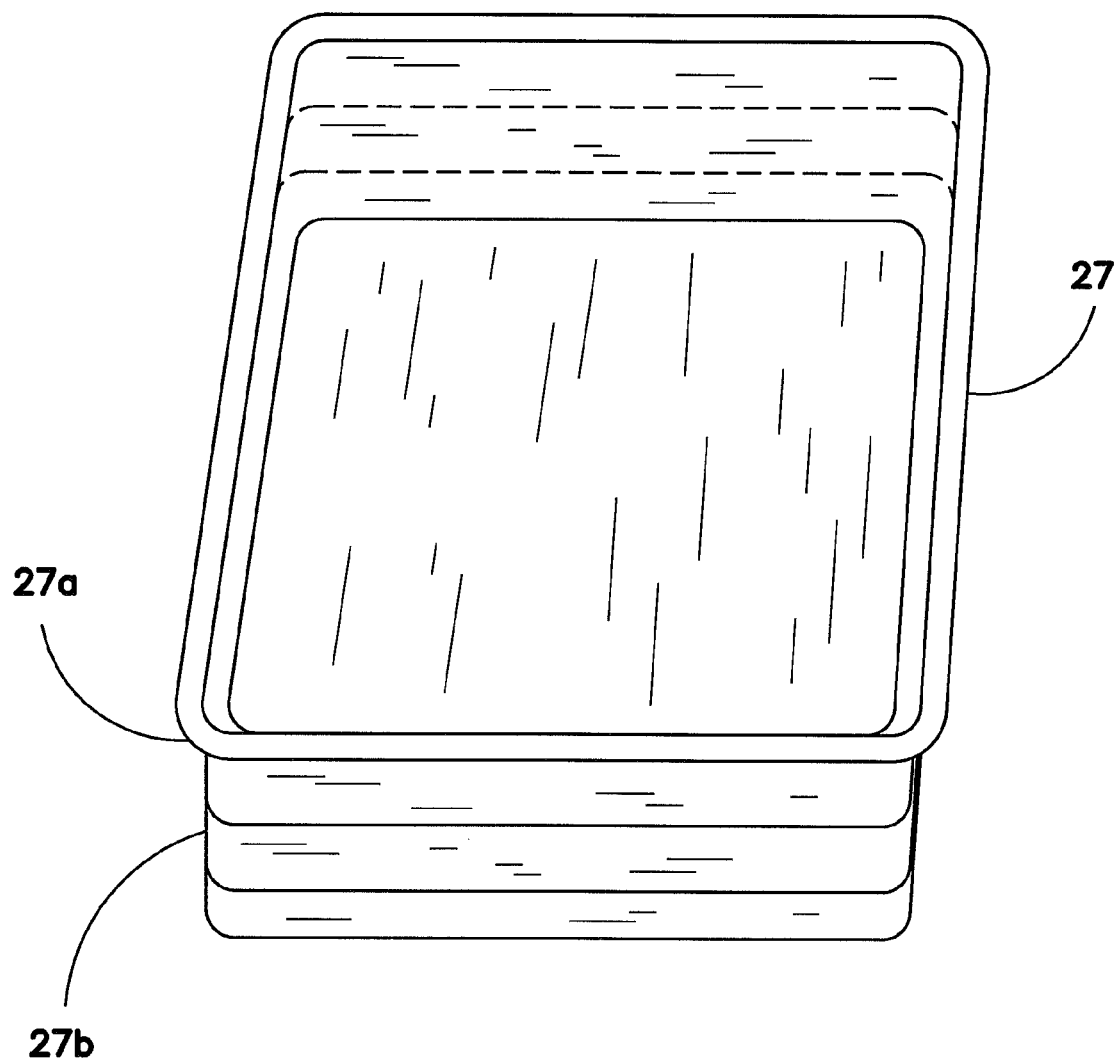

FIG. 4A shows one example of such an open top food container 27, but eleven open top food containers in five different shapes would be used in the portable food item displaying and serving apparatus 21 illustrated in FIG. 4. As illustrated in FIG. 4A, food container 27 includes a rim 27A around its open top that engages the edges of the panel 23 adjacent the panel openings 23a, supporting the food container 27 above the bottom of the base 22, or any floor 22a of the base 22. In addition, the body of one or more food containers 27 can be wrapped with an electrical resistance heating tape 27b energized by batteries, e.g., vehicle batteries, or the batteries of a golf cart if the golf cart is electrically driven, to maintain food items within the container 27 warm. Panel 23 can be formed with a variety of different shaped openings in a variety of numbers depending on the food items to be served and can be formed with openings to fit commercially available, inexpensive containers, thus permitting an apparatus 21 to inexpensively accommodate a variety of menus.

The embodiment shown in FIG. 4 also includes a means 26 for covering the food that can be present in the food containers 27 carried in the plurality of openings 23a in the panel 23. The means 26 for covering the plurality of food items comprises a retractable food cover carried at one end of the base 22 in a first position that does not cover the food items (as shown in FIG. 4) and can be moved to a second position covering the food items. The food covering means 26 is preferably a flexible fabric that is wrapped about a spool carried within one end of the base 22 with a fastener 26a at its end and can be unwrapped from the spool to be fastened over the food items and protect them from insects and debris and provide some thermal isolation from the ambient environment. If the base 22 is provided with a floor at its bottom, the enclosed space formed in the base below the food containers 27 can be provided with means to cool the food items in the plurality of food containers 27 carried by the panel 23; for example, ice or cold packs can be placed in the enclosed space. In addition, heating means may be located in the enclosed space beneath the food items to keep the food items desirably warm. Furthermore, the food cover can be adapted to assist in maintaining the food items warm and/or cool by making the flexible cover 26 of an insulating (thermally nonconductive) material, and, if desired, by providing the outside surface of the flexible screen with a heat reflective surface.

Means for maintaining a displaying and serving apparatus, such as the apparatus 21, in position in a transporting vehicle that permits access to food items carried by the apparatus by consumers adjacent the vehicle can be variously designed, depending on the vehicle to be used, to connect a surface of the displaying and serving apparatus 21 with an adjacent surface of the vehicle. As indicated above, the base 22 may be provided with means for attaching the base 22 with a surface of the vehicle by which it is transported. FIG. 5 illustrates one possible first means 24 for securing one end of the food item displaying and serving apparatus 21 to a vehicle surface. As shown in FIG. 5, the first means 24 is located at one end of the base 22 where it would be adjacent the passenger seat of a golf cart and comprises a rotatable arm 24a with a hook portion 24b at its end. The rotatable arm is shown in its first position where it is held at the end of the base 22 and can be rotated, as shown in dashed lines in FIG. 5, to its second position where the hook portion 24b can engage a portion of a vehicle, such as a tubular arm, at the passenger side of a golf cart, as shown in FIG. 2. Other means can be used to secure the base 22 of a food item displaying and serving apparatus 21 to a vehicle. For example, a clamp for engaging the passenger arm can be fastened to the side of the base 22 and held in an arm-engaging position by threaded fasteners, or one or more resilient clips can be placed to encompass the side of the base and the arm on the passenger side of a golf cart to secure the base 22 on the passenger seat 15.

FIG. 6 illustrates, in dashed lines, a possible second means 25 for engaging a vehicle surface forwardly of the passenger seat 15, if advisable. FIG. 6 shows that such a second means 25 for use with a golf cart can be a retractable leg 25a that can be folded in a first stored position against an outside surface of the base 22, and can be unfolded to a second position where its bottom can rest on the floor of a golf cart. The leg 25 can be of any usable length, any shape and any material so long as it has sufficient rigidity to support the end of the food item displaying and serving apparatus 21. While FIG. 6 shows a second means for engaging the floor of a golf cart, a second means, if needed, can engage any usable surface of a vehicle forwardly of the displaying and serving apparatus 21.

Figure 7:
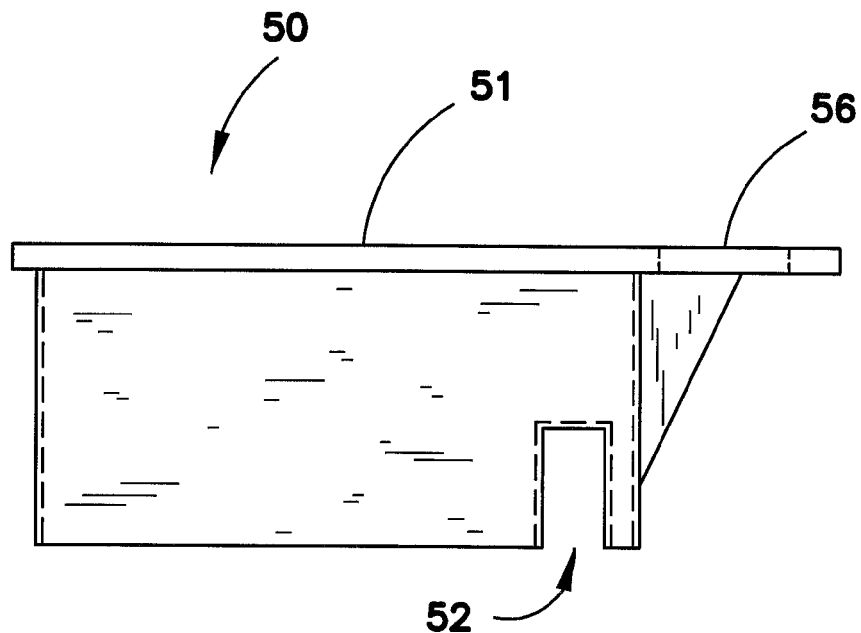
FIG. 7 is view of the right side of a modified food display and serving apparatus, as illustrated in FIG. 7, showing a support for the apparatus formed by slot formed in the right side of the base and adapted to engage a surface or surfaces at the passenger side of a vehicle.
Figure 8:
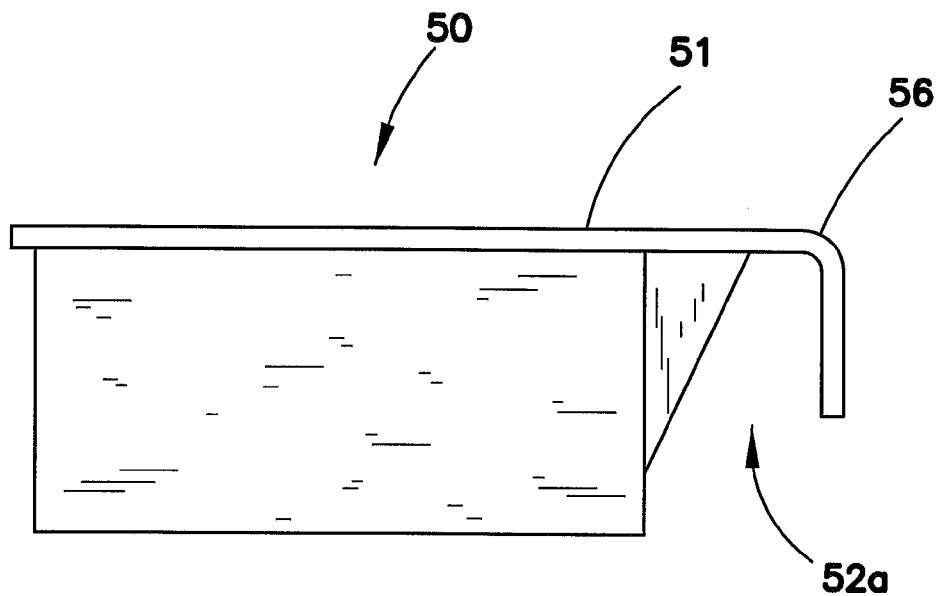
FIG. 8 is a view of the right side of another modified food display and serving apparatus, as illustrated in FIG. 8, showing a support for the apparatus formed by an extension at the cart-side of the apparatus forming a slot adapted to engage a surface or surfaces at the passenger of a vehicle.

FIGS. 7 and 8 illustrate other possible means for maintaining a food item display and serving apparatus of the invention in position in a vehicle, permitting a food item displaying and serving apparatus to be transported to possible consumers for selection and removal of selected food items from the display and serving apparatus. The food display and serving apparatus 50 of FIGS. 7 and 8 can transform a golf cart into a mobile food item display and serving apparatus by positioning a slot 52 formed in the base 53 of the food item display and serving apparatus 50 as shown in FIG. 7, or a slot 52a formed at the side of the base of the displaying and serving apparatus 51 as shown in FIG. 8, over the arm 17 at the passenger side of the golf cart and lowering the food item display and serving apparatus 50 onto the passenger seat 15 with the arm 17 at the passenger seat 15 trapped within the slot 52, 52a, and, if necessary, lowering a means 25 for engaging the floor 12 of the golf cart forwardly of the passenger seat 15. As with the embodiment shown in FIGS. 3-6, the base 51 of the embodiment of FIGS. 7 and 8 is preferably formed with a thermoplastic material by any convenient plastic molding or forming method. The food item-carrying panel, which is not shown by FIGS. 7 and 8, can also be formed from, preferably, a relatively rigid plastic material to fit within and be supported by the base 51 in the same manner as panel 23 of the embodiments described above and include a plurality of openings adapted to carry containers, like the food container 27 shown in FIG. 4A.

As indicated above, the invention provides new and improved methods of conveying, displaying, serving and selling small food items, such as snacks, finger foods and bite-size food items over extensive areas outdoors.

In methods of the invention various foods are selected for serving. The selected foods are then prepared for display and serving. The selected foods are cut, or otherwise reduced is size, if necessary, into sizes which permit an attractive display in a displaying and serving apparatus like that illustrated and described above, for example in FIGS. 3 and 4. Generally, the foods are reduced, if necessary, into, preferably, finger-food and/or snack-size portions permitting an attractive display for selection from a displaying and serving apparatus of the invention. Some selected foods may require cooking, which can be accomplished either before or after they have been cut into portions of a selected size. The preferred size depends on the selected food. For example, shrimp, oysters, clams, mussels and the like generally require no cutting and can be displayed and served in their existing size. Some meats, such as cooked beef and pork tenderloin and prepared cold meats, such as ham, bologna, pepperoni, are preferably cut into finger-food and/or snack-size portions. Gourmet breads can be cut into sizes permitting their selection and assembly with displayed meat portions into small sandwiches. Fruits and vegetables can be cut into bite-size pieces for consumption raw, and some vegetables can be cooked before they are displayed. For example, bite-size pieces of grilled asparagus make an attractive and desirable snack. Many food items require no preparation for display and serving. For example, potato and corn chips, crackers, cookies, candies and the like can be displayed for selection with no preparation except their placement in a serving container.

After the foods are prepared for display and service, pluralities of different selected food items are placed in open top containers, such as open top containers like that shown in FIG. 4A, either before or after the open-top food containers are placed in the plurality of openings 23a shown in FIG. 4, loading the displaying and serving apparatus illustrated by FIGS. 3 and 4. Thus, a wide variety of tasty and desirable snack foods can be attractively displayed in a displaying and serving apparatus of the invention and presented for selection and consumption.

The loaded displaying and serving apparatus can then carried, if necessary, to and placed in a small vehicle, such as a golf cart, for transportation to possible consumers. The vehicle and the loaded displaying and serving apparatus can be driven over an area such as a golf course, parking lot or other open area between possible consumers or groups of possible consumers. When the vehicle is stopped adjacent one or more possible consumers, the possible consumers can select food items from the displayed food items for consumption. In circumstances where the distribution of food items is not prepaid by an event sponsor, the vehicle driver can collect a sales price for the food items selected and consumed by the consumers. In such circumstances the sales price of each food item can be presented adjacent the food container for the food item.

In another aspect of the invention, a food displaying and serving apparatus of the invention, similar to that illustrated in FIGS. 3 and 4 but of reduced size and cost, can be adapted to be securely carried in a passenger vehicle and used to transport food items, such as snacks, for consumption by occupants of the passenger vehicle as they travel; e.g., the apparatus may be formed from coated paperboard like that used for paper plates and bowls, but heavier, or from polyethylene sheet, with pockets for carrying food items. Food purveyors, such as chain grocery stores and franchised food outlets, can load such food displaying and serving apparatus with snacks and other food items, and sell the loaded apparatus to the travelers, who may discard the empty apparatus after the food is consumed if it is cheap enough, or return it to the food purveyor who originally sold it, or an associated food purveyor, if it is to be recycled.

One of ordinary skill in the art will recognize that the descriptions, claims and figures of this application are examples of the invention and do not represent all possible embodiments features and methods that can be developed by those skilled in the art using the disclosure and that other embodiments and methods of the invention can be devised within the scope of the following claims.

I claim:

1. A portable food display and serving apparatus, comprising
    a base forming an interior space with an open top,
    a removable substantially flat panel, including a plurality of openings within the panel for carrying a plurality of food containers adjacent the open top of the base,
    means within the interior space of the base for horizontally supporting the removable substantially flat panel within the interior space of the base, and
    a plurality of open-top food containers removably supported and horizontally carried by the removable substantially flat panel within the plurality of openings of the panel for carrying and displaying adjacent the open top of the base a plurality of different food items for selection by a consumer.

2. The apparatus of claim 1 further comprising a means carried by said base for providing a covering for the food carried in said plurality of food containers.

3. The apparatus of claim 2 wherein the means comprises a retractable food cover carried by the base in a first position where the retractable food cover does not obstruct the selection of food items by a consumer and a second position where the retractable food cover covers the food items.

4. The apparatus of claim 3 wherein the retractable food cover comprises a flexible screen.

5. The apparatus of claim 4 wherein the flexible screen is adapted, in its first position, to be wrapped around a spool carried at one end of the base so as not to obstruct access to the food items by a consumer and to be unwrapped from the spool to extend over at least some of the food items carried by the plurality of open-top food containers in its second position.

6. The apparatus of claim 5 further comprising a well formed at one end of the interior space of the base to carry the flexible screen.

7. The apparatus claim 3 wherein the means comprising a retractable food cover comprises a flexible material having low thermal conductance with a heat reflective surface adapted to resist heat transfer to and from the food items.

8. The apparatus of claim 1 wherein the base is adapted to be secured to a vehicle by means, carried by the base, for securing the base to a vehicle surface.

9. The apparatus of claim 1 wherein the base comprises four walls and an open bottom, said four walls forming said interior space.

10. The apparatus of claim 1 wherein the base comprises a bottom surface and four walls wall extending upwardly from the bottom surface of the base defining an interior containing space.

11. The apparatus of claim 10 wherein the base is adapted to carry, within the interior containing space, cooling means for food items carried by the plurality of food containers.

12. The apparatus of claims claim 1 wherein the base is adapted to be carried by a portion of a vehicle.

13. A portable food display and serving apparatus, comprising
   a generally rectangular base adapted to be supported in a generally horizontal position, said generally rectangular base having four sidewalls extending generally vertically adjacent the periphery of the base,
   a generally rectangular panel having a plurality of openings therein to carry open top food containers, said panel being sized to be carried within the four side walls on support means within the four side walls and located for displaying and serving of food from the open top containers carried by the generally rectangular panel,
   a flexible cover, capable of being rolled into a cylindrical shape, carried by and within one of the four sidewalls, and of being unrolled to extend to and be fastened to the opposing sidewall over the generally rectangular panel carried by the four sidewalls of the generally rectangular base.

14. The portable food display and serving apparatus of claim 13 wherein said generally rectangular panel can be provided with a plurality of openings with sizes and shapes selected to display and serve a variety of food items.

15. The portable food display and serving apparatus of claim 13 wherein said flexible cover can be withdrawn from over the generally rectangular panel and rerolled into its generally cylindrical shape within one of the four sidewalls.

16. A portable food display and serving apparatus, comprising
   a base including a generally circumferential wall,
   a removable flat panel including one or more openings therein for carrying within the base one or more food containers, said base including within the generally circumferential wall one or more means for removably supporting said removable flat panel in a horizontal position,
   one or more food containers sized to be removably supported and carried within said one or more openings by said removable panel for displaying and serving food carried by said plurality of food containers.

17. The portable food display and serving apparatus of claim 16 wherein one or more of the food containers are wrapped with electrical resistance heating tape and are adapted to be heated by connection with an electric battery.

18. The portable food display and serving apparatus of claim 16 wherein the generally circumferential wall includes four generally vertically extending side walls and a generally rectangular base with a bottom extending between the four generally vertically extending side walls and forming an enclosure below the removable panel to carry cooling means for the food containers.

19. The portable food display and serving apparatus of claim 16 further comprising a flexible cover, capable of being rolled into a cylindrical shape, carried by and within the generally circumferential wall, and capable of being unrolled to extend over the removable flat panel and over the one or more food containers and fastened to an opposing portion of the generally circumferential wall.

\* \* \* \* \*